United States Patent
Lee et al.

(10) Patent No.: US 10,038,866 B2
(45) Date of Patent: Jul. 31, 2018

(54) IMAGE SENSOR AND IMAGE PROCESSING SYSTEM INCLUDING THE SAME

(71) Applicant: SAMSUNG ELECTRONICS CO., LTD., Suwon-si (KR)

(72) Inventors: Hyeok Jong Lee, Seongnam-si (KR); Sung Ho Suh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 14/854,245

(22) Filed: Sep. 15, 2015

(65) Prior Publication Data

US 2016/0088248 A1    Mar. 24, 2016

(30) Foreign Application Priority Data

Sep. 19, 2014    (KR) .......................... 10-2014-0124942

(51) Int. Cl.
- *H04N 3/14* (2006.01)
- *H04N 5/335* (2011.01)
- *H04N 5/378* (2011.01)

(52) U.S. Cl.
CPC .................................. *H04N 5/378* (2013.01)

(58) Field of Classification Search
None
See application file for complete search history.

(56) References Cited

U.S. PATENT DOCUMENTS

| | | |
|---|---|---|
| 7,623,173 B2 | 11/2009 | Nitta et al. |
| 7,875,842 B2 | 1/2011 | Kawaguchi et al. |
| 7,973,695 B2 | 7/2011 | Kudo |
| 8,054,209 B2 | 11/2011 | Krymski |
| 8,269,867 B2 | 9/2012 | Inada |
| 8,581,761 B1 | 11/2013 | Bahukhandi et al. |
| 2010/0225796 A1* | 9/2010 | Lim .................... H03M 1/0607 348/308 |
| 2011/0234871 A1* | 9/2011 | Taruki .................. H04N 5/3559 348/297 |
| 2011/0248145 A1* | 10/2011 | Tanaka .................. H03M 1/144 250/208.1 |
| 2012/0229319 A1 | 9/2012 | Takahashi et al. |
| 2013/0271633 A1* | 10/2013 | Hashimoto ............ H04N 5/353 348/300 |

FOREIGN PATENT DOCUMENTS

| | | |
|---|---|---|
| JP | 2006-128872 A | 5/2006 |
| JP | 2007-129523 A | 5/2007 |
| KR | 10-1211082 B1 | 12/2012 |

* cited by examiner

*Primary Examiner* — Stephen Coleman
(74) *Attorney, Agent, or Firm* — Sughrue Mion, PLLC

(57) ABSTRACT

An image sensor including a comparator configured to generate a comparison signal by comparing a ramp signal and a pixel signal with each other, a counter configured to generate a digital pixel value by counting an input clock signal according to the comparison signal, and a divider configured to control a frequency of the input clock signal according to an analog gain of the image sensor.

18 Claims, 11 Drawing Sheets

IMAGE SENSOR AND IMAGE PROCESSING SYSTEM INCLUDING THE SAME

CROSS-REFERENCE TO THE RELATED APPLICATION

This application claims priority from Korean Patent Application No. 10-2014-0124942, filed on Sep. 19, 2014, in the Korean Intellectual Property Office, the disclosure of which is incorporated herein in its entirety by reference.

BACKGROUND

1. Field

Apparatuses and methods consistent with exemplary embodiments of the inventive concept relate to an image sensor and an image processing system including the same, and more particularly, to an image sensor capable of reducing power consumption therein and an image processing system including the same.

2. Description of the Related Art

A solid-state imaging device which uses a complementary metal-oxide semiconductor (CMOS) is called the CMOS image sensor. The CMOS image sensor is known as low manufacturing costs, a small size, and low energy consumption, compared to the charge-coupled device (CCD) image sensor which employs a high-voltage analog circuit. Also, as the performance of the CMOS image sensor has been improved since its inception, this image sensor has been widely used in home appliances and portable devices such as smartphones, digital cameras, etc.

Recently, research has been actively conducted on improving the quality of an image to be generated by the CMOS image sensor that has been in a high demand. In particular, the resolution of a counter included in the CMOS image sensor has been enhanced to increase the quality of an image obtained by the CMOS image sensor. However, the higher the resolution of the counter, the greater the power consumption in the image sensor. Accordingly, there is a growing need to develop a method of solving this problem.

SUMMARY

According to an aspect of an exemplary embodiment of the inventive concept, there is provided an image sensor which may include: a comparator configured to generate a comparison signal by comparing a ramp signal with a pixel signal; a counter configured to generate a digital pixel value by counting an input clock signal according to the comparison signal; and a divider configured to control a frequency of the input clock signal according to an analog gain of the image sensor.

The image sensor may further include a timing generator configured to compare the analog gain with at least one reference gain, and generate a frequency control signal for controlling the divider according to a result of the comparing the analog gain with the at least one reference gain.

The divider may control the frequency of the input clock signal at a ratio of 1/2N determined according to the frequency control signal, wherein N denotes an integer equal to or greater than 0.

The divider may include a plurality of circuits, such as flip-flops, each configured to control a frequency of an internal clock signal at a ratio of 1/2j, wherein j denotes an integer equal to or greater than 1; and a multiplexer configured to select one of the internal clock signal and outputs of the plurality of circuits, and output the selected signal as the input clock signal.

The image sensor may further include a gain register configured to receive the analog gain from a digital signal processor and temporarily store the analog gain.

The image sensor may further include a bit shifter configured to shift the digital pixel value by a number of bits determined according to the frequency control signal.

The image sensor may further include a ramp signal generator configured to generate the ramp signal which has a slope of decrease from an original level determined according to the analog gain or the frequency control signal. In this respect, the comparator may be configured to generate the comparison signal when the ramp signal begins to decrease according to the slope of decrease.

The image sensor may further include a buffer configured to receive the digital pixel value from the counter after the ramp signal returns to the original level from the slope of decrease.

According to an aspect of another exemplary embodiment, there is provided an image processing system which may include the above image sensor and a digital signal processor configured to determine the analog gain.

According to an aspect of still another exemplary embodiment, there is provided an image sensor which may include: a comparator configured to generate a comparison signal by comparing a ramp signal with a pixel signal; and a counter configured to generate a digital pixel value by counting an input clock signal according to the comparison signal, wherein a level of the input clock signal varies according to an analog gain.

The image sensor may further include: a divider configured to control a frequency of the input clock signal according to the analog gain; and a timing generator configured to compare the analog gain with at least one reference gain, and control the divider according to a result of the comparing the analog gain with the at least one reference gain.

The divider may control the frequency of the input clock signal at a ratio of 1/2N determined according to the frequency control signal, wherein N denotes an integer equal to or greater than 0.

The divider may include a plurality of flip-flops each configured to control a frequency of an internal clock signal at a ratio of 1/2j, wherein j denotes an integer equal to or greater than 1; and a multiplexer configured to select one of the internal clock signal and outputs of the plurality of flip-flops, and output the selected signal as the input clock signal.

The image sensor may further include a bit shifter configured to shift the digital pixel value by a number of bits determined according to the frequency control signal or the analog gain.

A slope of the ramp signal may be determined by the analog gain.

According to an aspect of still another exemplary embodiment of the inventive concept, there is provided an image sensor which may include: a divider configured to receive an internal clock signal and output the internal clock signal or a frequency-reduced internal clock signal which is generated by reducing a frequency of the internal clock signal based on an analog gain of the image sensor; a counter configured to count an input clock signal, which is the internal clock signal or the frequency-reduced internal clock signal, and output a digital pixel value corresponding to the counted input clock signal.

The counter may be configured to count the input clock signal by counting a number of rising or falling edges of the input clock signal.

The divider may be configured to output the internal clock signal in response to the analog gain being less than a threshold value, and output the frequency-reduced internal clock signal in response to the analog gain being greater than or equal to the threshold value.

The divider may be configured to output the frequency-reduced internal clock, of which a frequency is reduced in proportion to the analog gain, as the input clock signal of the counter.

The analog gain may be set based on an illuminance of at least one previous frame sensed by the image sensor.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1:
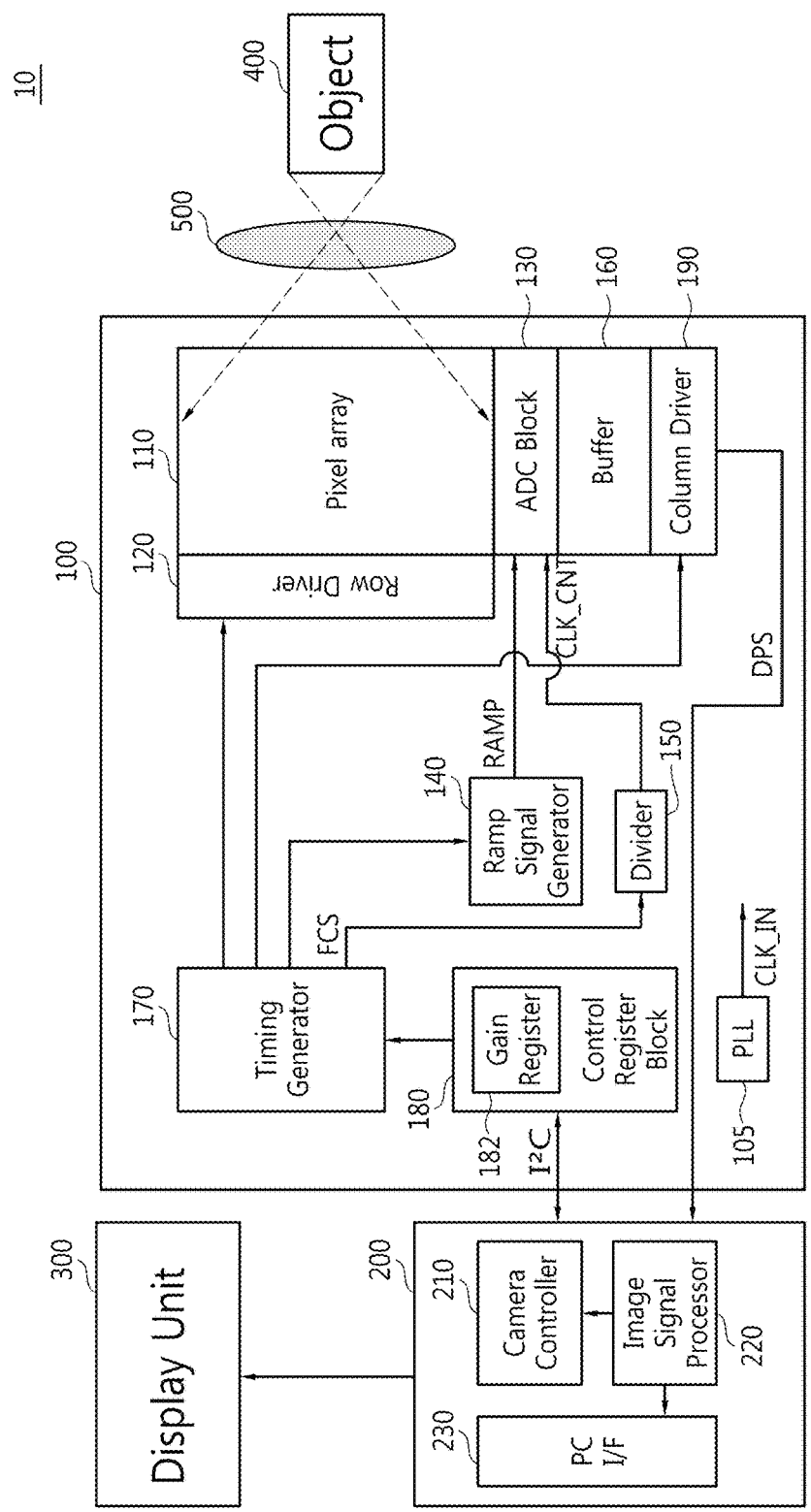
FIG. 1 is a block diagram of an image processing system including an image sensor, according to an exemplary embodiment of the inventive concept.

The inventive concept now will be described more fully hereinafter with reference to the accompanying drawings, in which exemplary embodiments thereof are shown. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like reference numbers refer to like elements throughout the specification and drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 including an image sensor 100 according to an exemplary embodiment of the inventive concept.

Referring to FIG. 1, the image processing system 10 according to an exemplary embodiment of the inventive concept may include an image sensor 100, a digital signal processor (DSP) 200, a display unit 300, and a lens 500. The DSP 200 is not limited to a particular type of a processor, and instead, may be implemented by various different types of image processor.

The image sensor 100 may include a phase-locked loop (PLL) 105, a pixel array 110, a row driver 120, an analog-digital converter (ADC) block 130, a ramp signal generator 140, a divider 150, a buffer 160, a timing generator 170, a control register block 180, and a column driver 190.

The image sensor 100 may sense an image of an object 400 captured using a lens 500 under control of the DSP 200. The DSP 200 may output the image, which is sensed by and output from the image sensor 100, to the display unit 300. Examples of the display unit 300 may include various devices capable of outputting an image. For example, the display unit 300 may be a computer, a smart-phone, an electronic device with a camera, etc.

The DSP 200 may include a camera controller 210, an image signal processor (ISP) 220, and a personal computer interface (PC I/F) 230. The camera controller 210 may control the image sensor 100 including the control register block 180 using an inter-integrated circuit (I²C) but embodiments of the inventive concept are not limited thereto.

The camera controller 210 may determine an analog gain according to a user's request or under control of the ISP 220. The analog gain will be described in detail with reference to FIG. 2 below. The camera controller 210 may transmit the analog gain which may be indicated in the form of a digital value to the control register block 180.

The ISP 220 receives a digital pixel signal DPS which is an output signal from the buffer 160, obtain an image by processing or treating the digital pixel signal DPS to be visible to human eyes, and output the image to the display unit 300 via the PC I/F 230.

Although FIG. 1 illustrates that the ISP 220 is included in the DSP 200, the design of the ISP 220 may be changed by those of ordinary skill in the art. For example, the ISP 220 may be included in the image sensor 100.

The ISP 220 may determine whether the analog gain is to be changed or maintained, based on the digital pixel signal DPS. For example, the ISP 220 may determine that the analog gain is to be decreased when a result of analyzing one frame or a predetermined number of frames generated from the digital pixel signal DPS reveals that the illumination (or illuminance) of the frame or the predetermined number of frames is high, i.e., the illumination is greater than or equal to a threshold illumination.

The ISP 220 may control the camera controller 210 to change or maintain the analog gain.

The PLL 105 may receive an external clock signal (not shown) from the outside of the image sensor 100 and generate an internal clock signal CLK_IN having a predetermined frequency from the external clock signal. The PLL 105 may supply the internal clock signal CLK_IN to the elements 110 to 190 of the image sensor 100 so as to operate them. In one embodiment, the PLL 105 may be a digital programming PLL.

The pixel array 110 includes a plurality of pixels (not shown) each including a photoelectric conversion device, e.g., a photo diode, a pinned photo diode, etc. The plurality of pixels generate pixel signals P1 to Pm of FIG. 2, respectively, by sensing light using the photoelectric conversion device and converting the light into an electric signal. Here, 'm' denotes an integer equal to or greater than '2'.

The control register block 180 may store a control signal received from the DSP 200, and provide it to the timing generator 170. In particular, the control register block 180 may include a gain register 182 that receives and temporarily stores the analog gain and provides the analog gain to the timing generator 170.

The timing generator 170 may output a control signal to the row driver 120, the ramp signal generator 140, the divider 150, and the column driver 190 so as to control operations or timing thereof.

In particular, the timing generator 170 may control the slope of a ramp signal RAMP generated by the ramp signal generator 140, based on the analog gain.

Also, the timing generator 170 may compare the analog gain with at least one reference gain, and generate a frequency control signal FCS for controlling the divider 150 according to a result of comparing the analog gain with the at least one reference gain. The frequency control signal FCS will be described in detail with reference to FIGS. 2 and 3 below.

The row driver 120 drives the pixel array 110 in units of rows. For example, the row driver 120 may generate control signals for controlling pixels (not shown) of the pixel array 110. The pixel array 110 outputs the pixel signals P1 to Pm, i.e., a reset signal and an image signals, to the ADC block 130 from a row selected under control of the row driver 120.

Figure 2:
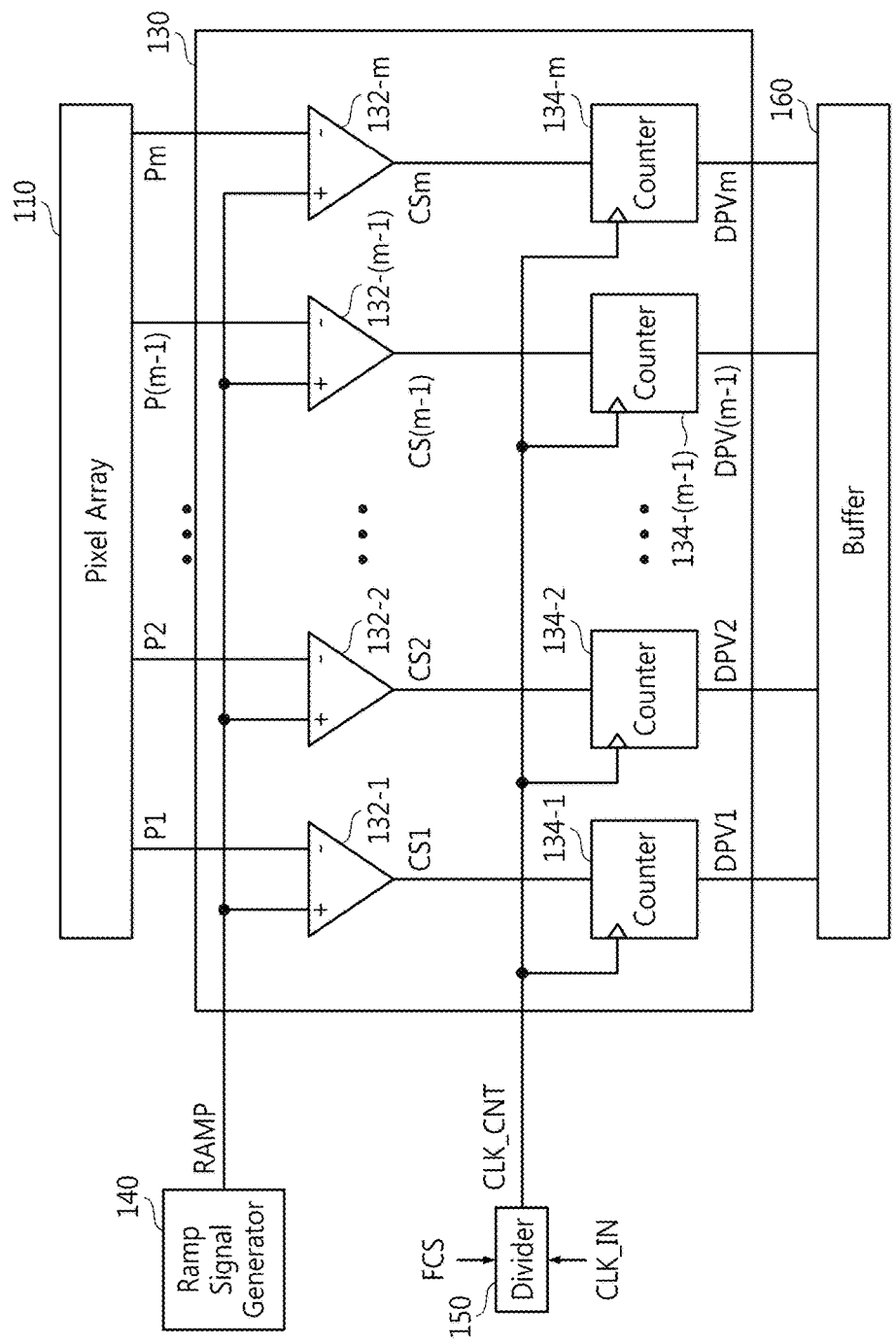
FIG. 2 illustrates a part of the image sensor of FIG. 1 to explain operations of the image sensor, according to an exemplary embodiment of the inventive concept.

The ADC block 130 generates comparison signals CS1 to CSm of FIG. 2 by comparing the ramp signal RAMP received from the ramp signal generator 140 with the pixel signals P1 to Pm output from the pixel array 110, counts an input clock signal CLK_CNT according to the comparison signals CS1 to CSm, and outputs digital pixel values DPV1 to DPVm of FIG. 2 to the buffer 160.

The ramp signal generator 140 may generate the ramp signal RAMP, the slope of which changes according to the analog gain, under control of the timing generator 170.

The divider 150 may determine a frequency of the internal clock signal CLK_IN according to the frequency control signal FCS that depends on the analog gain, and transmit the input lock signal CLK_CNT having the determined frequency to the ADC block 130.

The buffer 160 temporarily stores the digital pixel values DPV1 to DPVm output from the ADC block 130, and senses, amplifies, and outputs the digital pixel values DPV1 to DPVm.

The column driver 190 may control an operation of the buffer 160 under control of the timing generator 170.

Figure 3:
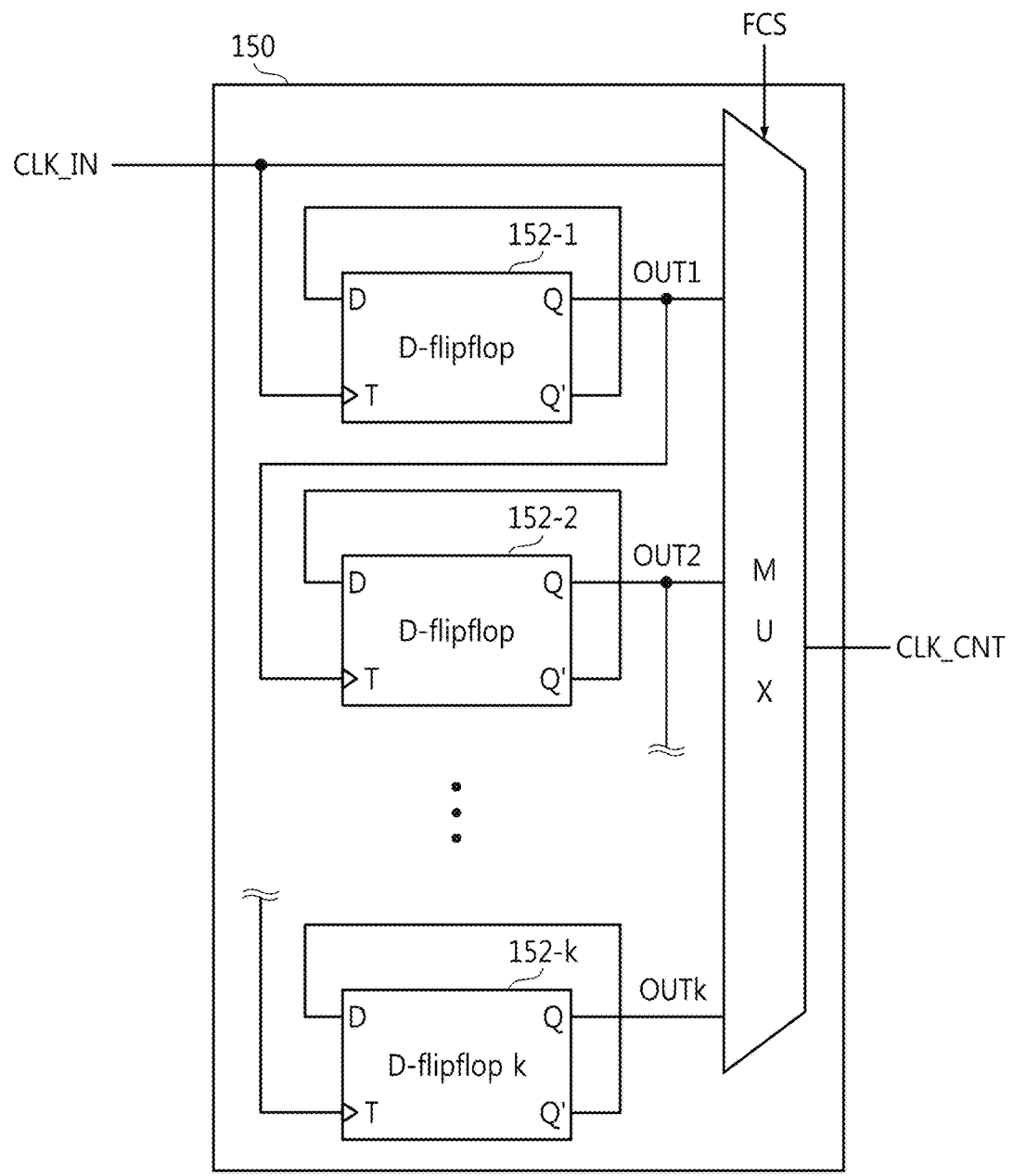
FIG. 3 is a circuit diagram of a divider of FIG. 2 according to an exemplary embodiment of the inventive concept.

FIG. 2 illustrates a part of the image sensor 100 of FIG. 1 to explain operations of the image sensor 100. FIG. 3 is a circuit diagram of the divider 150 of FIG. 2 according to an exemplary embodiment of the inventive concept.

Referring to FIGS. 1 to 3, the pixel array 110 may include a plurality of pixels arranged in a matrix including a plurality of rows and a plurality of columns. The pixel array 110 may output pixel signals P1 to Pm in units of columns. Each of the pixel signals P1 to Pm is obtained by converting the intensity of incident light into a voltage corresponding to the intensity of the incident light.

The ADC block 130 may include a plurality of comparators 132-1 to 132-m and a plurality of counters 134-1 to 134-m which correspond to the plurality of columns of the pixel array 110, respectively.

The comparators 132-1 to 132-m may generate comparison signals CS1 to CSm by comparing the pixel signals P1 to Pm with the ramp signal RAMP having a slope that changes according to an analog gain. The comparison signals CS1 to CSm are obtained by converting specific voltages of the respective pixel signals P1 to Pm into time periods, respectively, in which the comparison signals CS1 to CSm are maintained at a specific level (e.g., a high level), based on an amplification rate corresponding to the analog gain. That is, the analog gain may be an amplification rate for converting the specific voltages of the respective pixel signals P1 to Pm into time units.

The counters 134-1 to 134-m may generate digital pixel values DPV1 to DPVm by counting an input clock signal CLK_CNT according to the comparison signals CS1 to CSm, respectively. That is, the counters 134-1 to 134-m may count the number of edges (e.g. rising edges) of the input clock signal CLK_CNT during the time periods in which the comparison signals CS1 to CSm are maintained at the specific level (e.g., a high level), and generate the digital pixel values DPV1 to DPVm corresponding to a result of counting the edges (e.g., the rising edges) of the input clock signal CLK_CNT. The counters 134-1 to 134-m may transmit the digital pixel values DPV1 to DPVm to the buffer 160.

FIG. 3 illustrates the divider 150 according to an exemplary embodiment of the inventive concept but the inventive concept is not limited thereto.

The divider 150 may include a plurality of flip-flops 152-1 to 152-k and a multiplexer (MUX) 154. Here, 'k' denotes an integer equal to or greater than 2.

Each of the plurality of flip-flops 152-1 to 152-k may be embodied as a D-flip-flop, and include a data input terminal D and an inversion output terminal Q' connected to each other. A clock input terminal T of an $i^{th}$ flip-flop 152-i is connected to a non-inversion output terminal Q of an $(i-1)^{th}$ flip-flop 152-(i−1), except for the first flip-flop 152-1. Here, 'i' denotes an integer that is equal to or greater than 2 and less than or equal to 'k'. A clock input terminal T of the first flip-flop 152-1 may be connected to the PLL 105 to receive an internal clock signal CLK_IN.

The plurality of flip-flops 152-1 to 152-k may receive a signal input to the clock input terminals T thereof and output signals OUT1 to OUTk having a frequency that is half the frequency of the input signal, respectively. That is, the frequency of an output OUTj of a $j^{th}$ flip-flop 152-j may be 1/2j times of the frequency of the internal clock signal CLK_IN. Here, 'j' denotes an integer that is equal to or greater than 1 and less than or equal to 'k'.

Thus, each of the plurality of flip-flops 152-1 to 152-k may change the frequency of the internal clock signal CLK_IN at a ratio of 1/2j.

The multiplexer 154 may select one of the internal clock signal CLK_IN and outputs OUT1 to OUTk of the plurality of flip-flops 152-1 to 152-k according to a frequency control signal FCS, and output the selected signal as the input clock signal CLK_CNT.

As described above, the timing generator 170 compares the analog gain with at least one reference gain and generates the frequency control signal FCS according to a result of comparing the analog gain with the at least one reference gain.

For example, it is assumed that the at least one reference gain is 10×, 20×, . . . , or k*10×. Here, 10× means 10 times of a unit gain. The unit gain is a predetermined arbitrary analog gain.

The timing generator 170 may generate the frequency control signal FCS based on a result of comparing the analog gain with the at least one reference gain (e.g., 10×, 20×, . . . , or k*20×) sequentially or in parallel. The timing generator 170 may generate a frequency control signal FCS for controlling the internal clock signal CLK_IN to be selected as the input clock signal CLK_CNT when the analog gain is 10× or less, and generate a frequency control signal FCS for controlling an output OUT1 of the first flip-flop 152-1 to be selected as the input clock signal CLK_CNT when the analog gain is greater than 10× and equal to or less than 20×. Similarly, the timing generator 170 may generate a frequency control signal FCS for controlling an output OUTk of the $k^{th}$ flip-flop 152-k to be selected as the input clock signal CLK_CNT when the analog gain is greater than k*10×.

Thus, the divider 150 may control the frequency of the input clock signal CLK_CNT at a ratio of 1/2N determined according to the frequency control signal FCS. Here, 'N' denotes an integer equal to or greater than 0.

Figure 4:
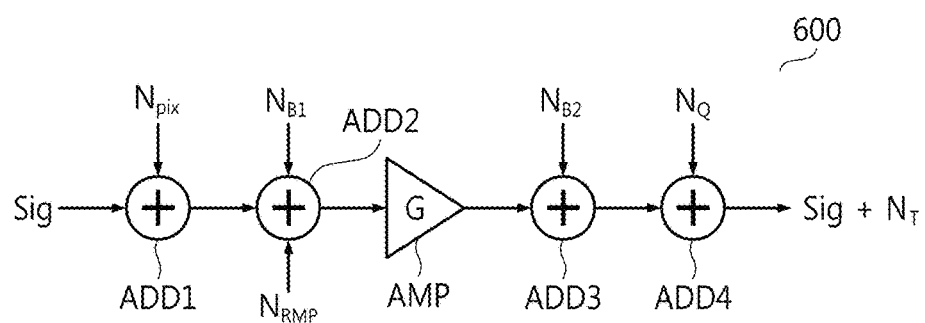
FIG. 4 illustrates a model of noise generated from the part of the image sensor illustrated in FIG. 2, according to an exemplary embodiment of the inventive concept.
Figure 5:
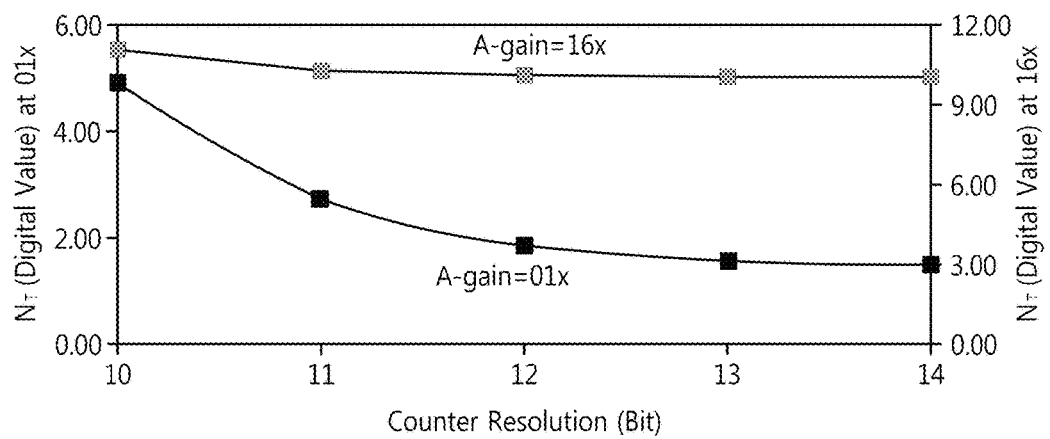
FIG. 5 is a graph showing the relationship between a counter resolution and random noise according to an analog gain, according to an exemplary embodiment of the inventive concept.

FIG. 4 illustrates a model 600 of noise generated from the part of the image sensor 100 illustrated in FIG. 2. FIG. 5 is a graph showing the relationship between a counter resolution and random noise according to an analog gain.

Referring to FIGS. 1 to 5, the model 600 of noise is a result of modeling a process of adding various noises to an original signal Sig.

That is, a process of generating total noise NT to be added to the original signal Sig is modeled when the original signal Sig is finally output.

If it is assumed that the original signal Sig corresponds to the intensity of incident light, pixel noise Npix generated during conversion of the intensity of the incident light into voltages of the pixel signals P1 to Pm is added in a first adding operation ADD1. The pixel noise Npix may be mainly generated in a pixel (not shown). For example, the pixel noise Npix may be, for example, row noise. The pixel noise Npix means noise that changes voltages of the pixel signals P1 to Pm.

In a second adding operation ADD2, ramp noise NRAMP generated by the ramp signal generator 140 and first noise NB1 that is generated by the comparators 132-1 to 132-m and depends on an analog gain are added. The ramp noise NRAMP means noise that causes the timing or slope of a ramp signal RAMP to be changed differently than as intended by controlling the timing generator 170.

In an amplification operation AMP, noises Npix, NRAMP, and NB1 generated in the operations prior to the amplification operation AMP are amplified at an amplification rate corresponding to the analog gain through operations of the comparators 132-1 to 132-m.

In a third adding operation ADD3, second noise NB2 that is generated by the comparators 132-1 to 132-m and that is not related to the analog gain is added. That is, noises generated by the comparators 132-1 to 132-m include the first noise NB1 that varies according to the analog gain and the second noise NB2 that is not related to the analog gain. However, both the first noise NB1 and the second noise NB2 mean noise generated to change time periods in which the comparison signals CS1 to CSm which are outputs of the respective comparators 132-1 to 132-m are maintained at a specific level (e.g., a high level).

In a fourth adding operation ADD4, counter noise NQ generated by the counters 134-1 to 134-m is added. The counter noise NQ means quantization noise generated when the comparison signals CS1 to CSm which are analog signals are converted into digital pixel values DPV1 to DPVm which are digital signals, respectively.

That is, the noises Npix, NRAMP, and NB1 added in the operations prior to the amplification process AMP are amplified at the amplification rate corresponding to the analog gain but the noises NB2 and NQ added in the operations after the amplification operation AMP are not amplified at the amplification rate corresponding to the analog gain.

Thus, when the analog gain is not high (for example, when the analog gain is 01× in FIG. 5), the counter noise NQ may dominant over the total noise NT. However, when the analog gain is high (for example, when the analog gain is 16× in FIG. 5), the counter noise NQ is not dominant over the total noise NT. This is because that the noises Npix, NRAMP, and NB1 added in the operations prior to the amplification operation AMP are amplified at the amplification rate corresponding to the analog gain, and are thus very dominant over the total noise NT, compared to the counter noise NQ.

FIG. 5 is a graph showing the relationship between a counter resolution and the total noise NT according to an analog gain (A-gain).

The counter resolution means the number of bits that may be expressed by the counters 134-1 to 134-m. Whenever the number of bits increases by one, power consumption in the counters 134-1 to 134-m increases to a large extent.

The counter noise NQ may increase as the counter resolution decreases and may decrease as the counter resolution increases.

If the analog gain (A-gain) is 01×, a digital value of the total noise NT doubles or more, e.g., the digital value increases from about '1.8' to about '4.5', when the counter resolution decreases from 14 bits to 10 bits, i.e., when the counter noise NQ increases by a predetermined level.

In contrast, if the analog gain (A-gain) is 16×, the digital value of the total noise NT increases only by about 10%, e.g., the digital value increases from about '10' to about '11', when the counter resolution decreases from 14 bits to 10 bits, i.e., when the counter noise NQ increases by the predetermined level.

That is, the counter noise NQ is not dominant over the total noise NT when the analog gain (A-gain) is high, e.g., 16×, unlike when the analog gain (A-gain) is low, e.g., 01×.

The at least one reference gain described above with reference to FIG. 3 may be a value that has been experimentally determined beforehand in consideration of an influence of the counter noise NQ over the total noise NT. For example, if the at least one reference gain is 10×, 20×, ..., k*10×, '10×' may be a reference gain that does not greatly influence the performance of the image sensor 100 even when the counter resolution is decreased by one bit, and '20×' may be a reference gain that does not greatly influence the performance of the image sensor 100 even when the counter resolution is decreased by 2 bits.

Figure 6:
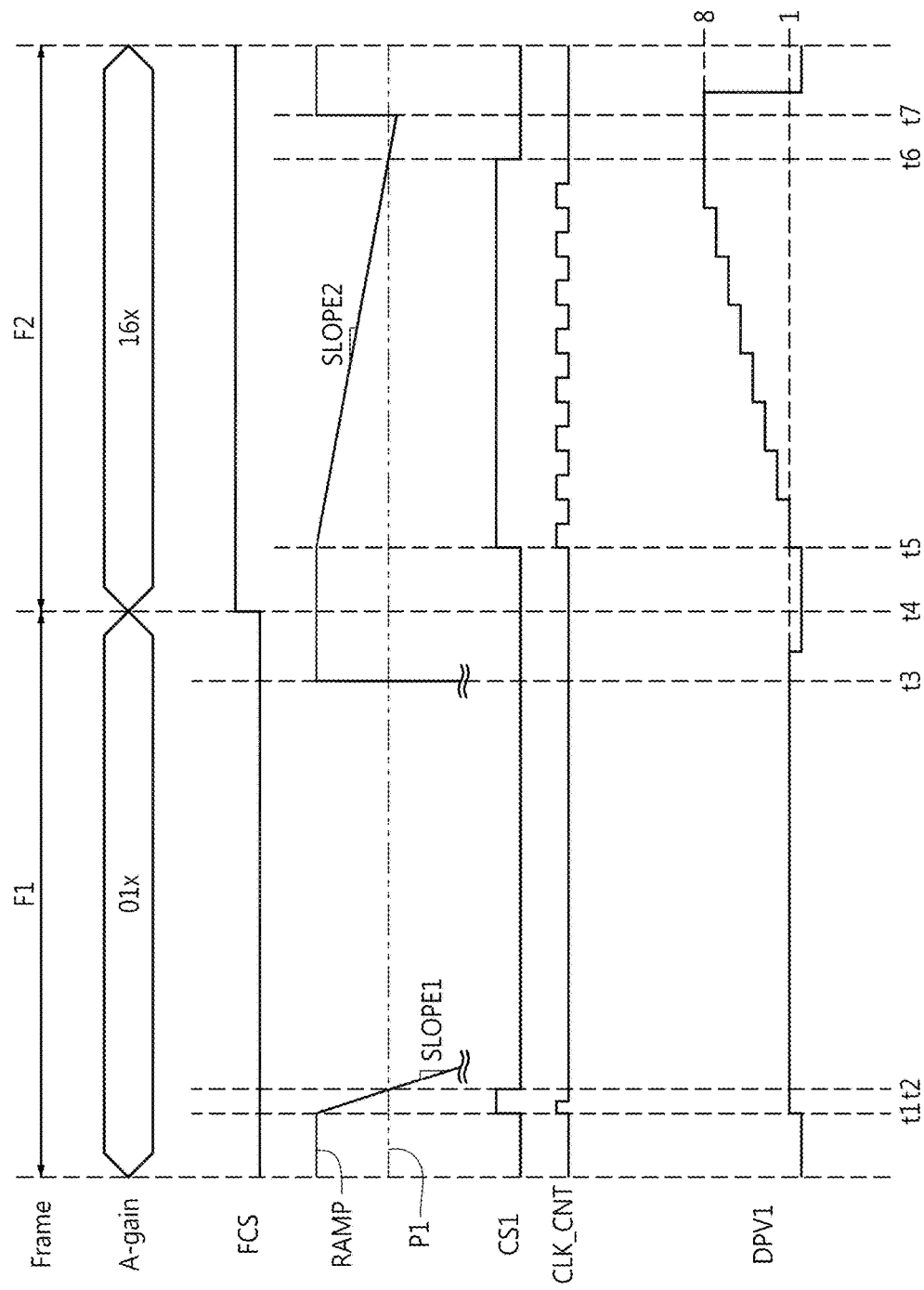
FIG. 6 is a timing diagram illustrating an operation of the image sensor of FIG. 2, according to an exemplary embodiment of the inventive concept.

FIG. 6 is a timing diagram illustrating an operation of the image sensor 100 of FIG. 2.

Referring to FIGS. 1 to 6, an ADC process performed on a first pixel signal P1 of a first column of the pixel array 110 during a first frame F1 and a second frame F2 is illustrated.

Each of the first frame F1 and the second frame F2 means a time period required to generate the first pixel signal P1 and complete a readout operation performed on the first pixel signal P1. It is assumed that the analog gain (A-gain) is maintained to be 01× and 16× in the first and second frames F1 and F2, respectively.

In the first frame F1, the analog gain (A-gain) is 10× or less and thus the timing generator 170 generates a frequency control signal FCS for controlling an internal clock signal CLK_IN to be selected as an input clock signal CLK_CNT. In the second frame F2, the analog gain (A-gain) is greater than 10× or less than or equal to 20× and thus the timing generator 170 generates a frequency control signal FCS for controlling an output OUT1 of the first flip-flop 152-1 to be selected as the input clock signal CLK_CNT. Here, it is assumed that the internal clock signal CLK_IN is controlled to be selected when the frequency control signal FCS is a low level, and the output OUT1 of the first flip-flop 152-1 is controlled to be selected when the frequency control signal FCS is a high level.

It is assumed that a voltage of the first pixel signal P1 is maintained constant during the first frame F1 and the second frame F2.

At a point of time t1, a level of a ramp signal RAMP decreases with a first slope SLOPE1. Also, the comparator 132-1 begins to operate. At this time, the level of the ramp signal RAMP is higher than that of the first pixel signal P1, and thus, a comparison signal CS1 output from the comparator 132-1 goes logic high.

During the first frame F1, the input clock signal CLK_CNT corresponds to the internal clock signal CLK_IN. Thus, the counter 134-1 detects and counts rising edges of the internal clock signal CLK_IN, starting from the point of time t1, and outputs a first digital pixel value DPV1.

At a point of time t2, the level of the ramp signal RAMP is lower than that of the first pixel signal P1 and thus the comparison signal CS1 goes logic low.

That is, the comparison signal CS1 is maintained at logic high from the point of time t1 to the point of time t2. A time period from the point of time t1 to the point of time t2 is a result of converting a voltage of the first pixel signal P1 into a time level at an amplification rate according to an analog gain (A-gain). Also, during the time period from the point of time t1 to the point of time t2, the input clock signal CLK_CNT is counted to convert the time period from the point of time t1 to the point of time t2 into a digital value.

At a point of time t3, the ramp signal RAMP returns to the original level thereof. Then, the first digital pixel value DPV1 is transmitted to the buffer 160. In FIG. 6, during the first frame F1, the first digital pixel value DPV1 corresponds to '1'.

At a point of time t4, the second frame F2 starts and the analog gain (A-gain) changes from 01× to 16×, and the frequency control signal FCS goes logic high. Thus, the output OUT1 of the first flip-flop 152-1 is selected as the input clock signal CLK_CNT.

At a point of time t5, the level of the ramp signal RAMP decreases with a second slope SLOPE2. The second slope SLOPE2 is 16 times lower than the first slope SLOPE1. Also, the comparator 132-1 starts to operate. At this time the level of the ramp signal RAMP is higher than that of the first pixel signal P1, and thus, the comparison signal CS1 goes logic high.

During the second frame F2, the input clock signal CLK_CNT corresponds to the output OUT1 of the first flip-flop 152-1 having a frequency that is half that of the internal clock signal CLK_IN. Starting from the point of time t5, the counter 134-1 detects and counts rising edges of the output OUT1 of the first flip-flop 152-1 and outputs the first digital pixel value DPV1.

At a point of time t6, the level of the ramp signal RAMP becomes lower than that of the first pixel signal P1 and thus the comparison signal CS1 goes logic low.

That is, the comparison signal CS1 is maintained at logic high from the point of time t5 to the point of time t6. A time period from the point of time t5 to the point of time t6 is a result of converting a voltage of the first pixel signal P1 into a time level at an amplification rate corresponding to the analog gain (A-gain). Also, during the time period from the point of time t5 to the point of time t6, the input clock signal CLK_CNT is counted to convert the time period from the point of time t5 to the point of time t6 into a digital value.

At a point of time t7, the ramp signal RAMP returns to the original level thereof and then the first digital pixel value DPV1 is transmitted to the buffer 160. In FIG. 6, during the second frame F2, the first digital pixel value DPV1 corresponds to '8'.

Since the voltage of the first pixel signal P1 is maintained constant during the first frame F1 and the second frame F2 and the analog gain (A-gain) increases 16 times during the second frame F2, the first digital pixel value DPV1 should be actually '16'. However, since the input clock signal CLK_CNT changes to the output OUT1 of the first flip-flop 152-1 having a frequency that is half the frequency of the internal clock signal CLK_IN according to the frequency control signal FCS, the first digital pixel value DPV1 becomes '8' instead of '16' during the second frame F2.

The number of binary bits of the counter 134-1 should be at least five so that '16' can be counted, but it may be reduced to four so that '8' may be counted. Thus, during the second frame F2 in which the analog gain (A-gain) is high, the number of binary bits of the counter 134-1 may be decreased, thereby decreasing power consumption in the counter 134-1.

When the number of binary bits of the counter 134-1 (i.e., the resolution of the counter 134-1) decreases, the counter noise NQ may increase. However, as described above with reference to FIGS. 4 and 5, when the analog gain (A-gain) is high, the counter noise NQ is not dominant over the total noise NT and thus noise caused by the first digital pixel value DPV1 is negligible.

Thus, in the image sensor 100 according to the exemplary embodiment of the inventive concept, when the analog gain (A-gain) is high, the frequency of the input clock signal CLK_CNT may be controlled to decrease the power consumption in the counter 134-1.

Also, during the second frame F2, since the first digital pixel value DPV1 is '8', the first digital pixel value DPV1 may be corrected to the original value thereof, e.g., '16', or a value that approximates the original value at a rear end of the ADC block 130, e.g., the buffer 160 or the DSP 200.

Also, in the image sensor 100 according to the exemplary embodiment of the inventive concept, a degree to which the frequency of the input clock signal CLK_CNT is to be adjusted is determined by the divider 150 according to the analog gain (A-gain). Accordingly, the power consumption in the counter 134-1 may be decreased gradationally and effectively.

Although in the timing diagram of FIG. 6, the exemplary embodiment of the inventive concept has been described only with respect to the first pixel signal P1 for convenience of explanation, this embodiment of the inventive concept is also applicable to the other pixel signals P2 to Pm.

Figure 7:
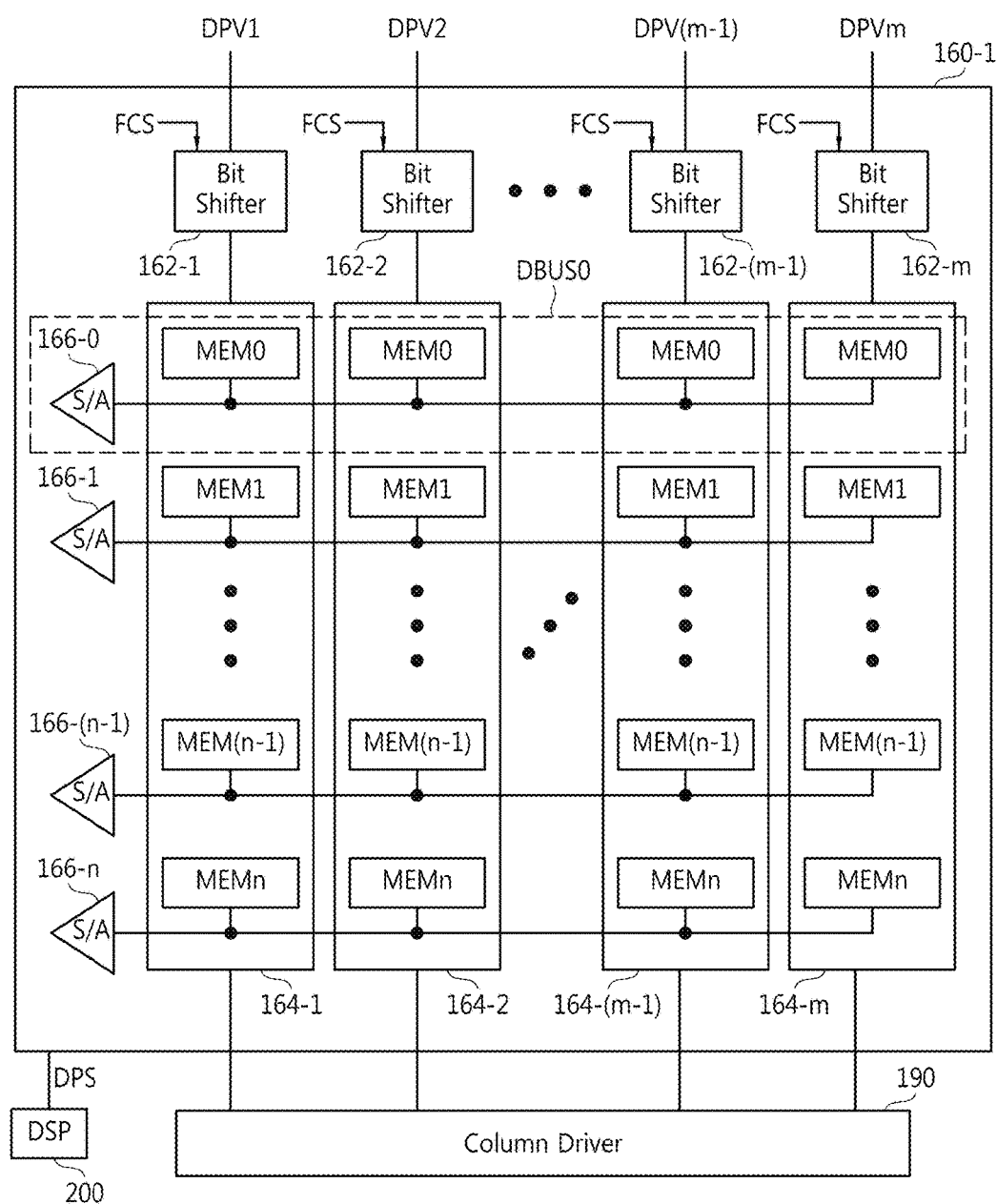
FIG. 7 is a block diagram of a buffer illustrated in FIG. 2, according to an exemplary embodiment of the inventive concept.
Figure 8:
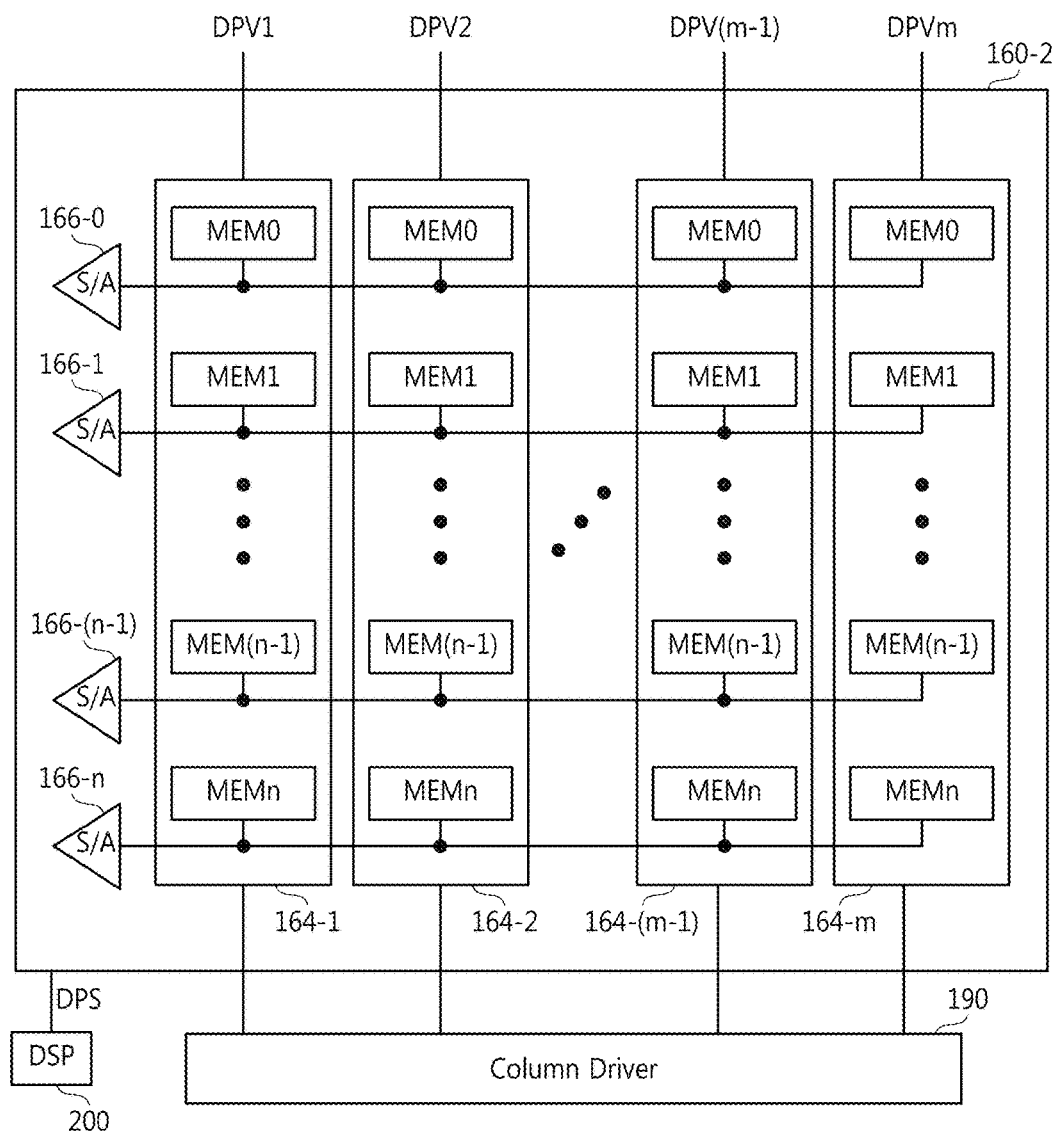
FIG. 8 is a block diagram of a buffer illustrated in FIG. 2, according to another exemplary embodiment of the inventive concept.

FIG. 7 is a block diagram of a buffer 160-1 such as that illustrated in FIG. 2 according to an exemplary embodiment of the inventive concept. FIG. 8 is a block diagram of a buffer 160-2 such as that illustrated in FIG. 2 according to another exemplary embodiment of the inventive concept.

Referring to FIGS. 1 to 8, the buffer 160-1 of FIG. 7 may include a plurality of bit shifters 162-1 to 162-m, a plurality of memories 164-1 to 164-m, and a plurality of sense amplifiers (S/As) 166-0 to 166-n.

The plurality of bit shifters 162-1 to 162-m may shift digital pixel values DPV1 to DPVm corresponding thereto by a predetermined number of bits determined according to a frequency control signal FCS.

For example, when during the first frame F1, the frequency control signal FCS has a level that causes an internal clock signal CLK_IN to be selected as an input clock signal CLK_CNT as described above with reference to FIG. 6, the bit shifters 162-1 to 162-m may not shift the corresponding digital pixel values DPV1 to DPVm.

However, when during the second frame F2, the frequency control signal FCS has a level that causes the output OUT1 of the first flip-flop 152-1 to be selected as the input clock signal CLK_CNT, the bit shifters 162-1 to 162-m may shift the corresponding digital pixel values DPV1 to DPVm by one bit.

Similarly, when the frequency control signal FCS has a level that causes an output OUTk of a $k^{th}$ flip-flop 152-k to be selected as the input clock signal CLK_CNT, the bit shifters 162-1 to 162-m may shift the corresponding digital pixel values DPV1 to DPVm by k bits.

Each of the plurality of memories 164-1 to 164-m may store a total of (n+1) bits, and include a $0^{th}$ memory MEM0 that stores least significant bits to an $n^{th}$ memory MEMn that stores most significant bits.

The plurality of memories 164-1 to 164-m may store the bit-shifted digital pixel values DPV1 to DPVm transmitted from the bit shifters 162-1 to 162-m corresponding thereto, respectively.

For example, when the first digital pixel value DPV1 generated during the second frame F2 is '8' (i.e., a binary number '1000') and is input to the bit shifter 162-1, the bit shifter 162-1 may shift the binary number '1000' by one bit according to the frequency control signal FCS. The shifting of the binary number '1000' should be understood as storing the binary number '1000' in the first memory MEM1 to the fourth memory MEM4 other than the $0^{th}$ memory MEM0 to the third memory MEM3.

An output of the $0^{th}$ memory MEM0 which is emptied by bit-shifting may be fixed to a voltage representing '0'. The sense amplifier 166-0 related to least significant bits and the $0^{th}$ memory MEM0 included in each of the plurality of memories 164-1 to 164-m may be defined using a $0^{th}$ data bus DBUS0. Since the output of the $0^{th}$ memory MEM0 is fixed to the voltage representing '0', the $0^{th}$ data bus DBUS0 need not be operated during the second frame F2 and thus power consumption in the $0^{th}$ data bus DBUS0 may decrease.

Since the binary number '1000' is stored in the first memory MEM1 to the fourth memory MEM4, a digital value represented by the memory 164-1 is a binary number '10000', i.e., '16'. That is, the first digital pixel value DPV1 may be corrected to '16', which is the original first digital pixel value DPV1 during the second frame F2, through bit-shifting.

The bit-shifting may be performed using a plurality of switches (not shown) included in the bit shifters 162-1 to 162-m but the exemplary embodiments of the inventive concept are not limited thereto.

Each of the sense amplifiers 166-0 to 166-n may sense and amplify a digital value output from a memory selected from among the plurality of memories 164-1 to 164-m by the column driver 190, and then output the digital value as a digital pixel signal DPS.

The buffer 160-2 of FIG. 8 does not include the plurality of bit shifters 162-1 to 162-m, unlike the buffer 160-1 of FIG. 7.

Thus, the plurality of memories 164-1 to 164-m may directly store the digital pixel values DPV1 to DPVm, respectively. Each of a plurality of sense amplifiers 166-0 to 166-n may sense and amplify the digital pixel value DPV1, . . . , or DPVm output from a memory selected from among the plurality of memories 164-1 to 164-m by the column driver 190, and output it as a digital pixel signal DPS.

For example, when an analog gain (A-gain) is 16× (i.e., during the second frame F2 of FIG. 6), the number of binary bits of each of counters 134-1 to 134-m decreases by one bit. Thus, when the internal clock signal CLK_IN is used as the input clock signal CLK_CNT for the counters 134-1 to 134-m, a data bus corresponding to a most significant bit of the digital pixel values DPV1 to DPVm (a fourth data bus in FIG. 7) is not used.

Thus, the data bus need not be operated during the second frame F2 and power consumption in the data bus may decrease.

A DPS 200 may correct the digital pixel signal DPS by a number of bits determined according to a predetermined analog gain or a frequency control signal FCS.

For example, in the embodiment of FIG. 6, the DPS 200 may correct the digital pixel signal DPS which is '8' (i.e., '1000') during the second frame F2 to '10000' without correcting the digital pixel signal DPS which is '1' during the first frame F1, similar to the result of performing bit-shifting described above with reference to FIG. 7.

Thus, in the image sensor 100 according to the exemplary embodiment of the inventive concept, when the analog gain is high, the frequency of the input clock signal CLK_CNT may be controlled to decrease power consumption in the counter 134-1 and an error of a digital pixel value caused by a change in the frequency of the input clock signal CLK_CNT may be corrected to maintain the performance of the image sensor 100.

Figure 9:
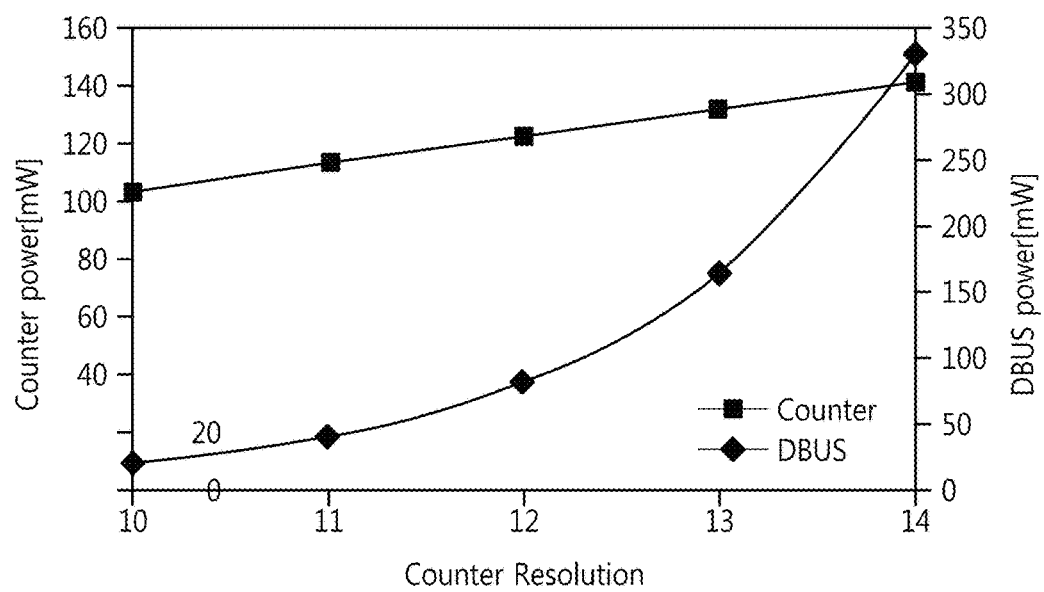
FIG. 9 is a graph showing the relationship between the amount of power consumption in a counter or a buffer included in the image sensor of FIG. 1 and a counter resolution, according to an exemplary embodiment of the inventive concept.

FIG. 9 is a graph showing the relationship between the amount of power consumed in a counter or a buffer included in the image sensor 100 of FIG. 1 and a counter resolution.

Referring to FIGS. 1 to 9, the amount of counter power to be consumed in the plurality of counters 134-1 to 134-m decreases about twice whenever the counter resolution decreases by one bit.

Also, whenever the counter resolution decreases by one bit, the amount of buffer power to be consumed in the buffer 160 decreases by a level corresponding to the amount of power consumption in one data bus other than in units of data buses.

When an analog gain is high, the counter noise NQ is not dominant over the total noise NT and thus the counter resolution may be decreased. When the counter resolution is decreased, power consumption in the plurality of counters 134-1 to 134-m and the buffer 160 may decrease.

Figure 10:
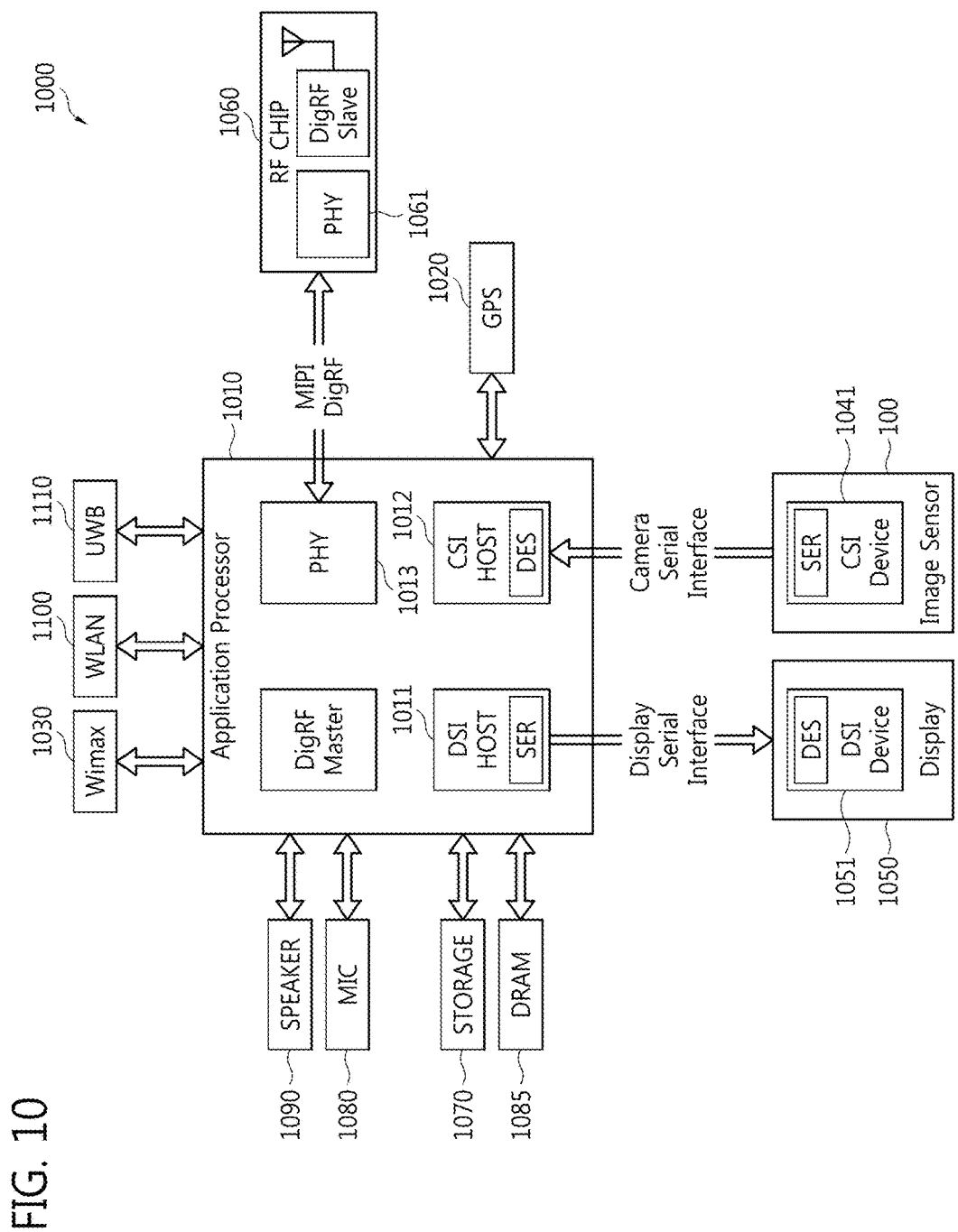
FIG. 10 is a block diagram of an electronic system including the image sensor, according to some exemplary embodiments of the inventive concept.

FIG. 10 is a block diagram of an electronic system including the image sensor according to some exemplary embodiments of the inventive concept. The electronic system 1000 may be implemented by a data processing apparatus, such as a mobile phone, a personal digital assistant (PDA), a portable media player (PMP), an Internet protocol television (IP TV), or a smart phone that can use or support the mobile industry processor interface (MIPI). The electronic system 1000 includes an application processor 1010, the image sensor 100, and a display 1050.

A camera serial interface (CSI) host 1012 included in the application processor 1010 performs serial communication with a CSI device 1041 included in the image sensor 100 through CSI. For example, an optical de-serializer (DES) may be implemented in the CSI host 1012, and an optical serializer (SER) may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060 which communicates with the application processor 1010. A physical layer (PHY) 1013 of the electronic system 1000 and a PHY 1061 of the RF chip 1060 communicate data with each other according to a MIPI DigRF standard. The electronic system 1000 may further include at least one element among a global positioning system (GPS) 1020, a storage device 1070, a microphone 1080, a dynamic random access memory (DRAM) 1085 and a speaker 1090. The electronic system 1000 may communicate using Wimax (World Interoperability for Microwave Access) 1030, WLAN (Wireless LAN) 1100 or UWB (Ultra Wire band) 1110 etc.

Figure 11:
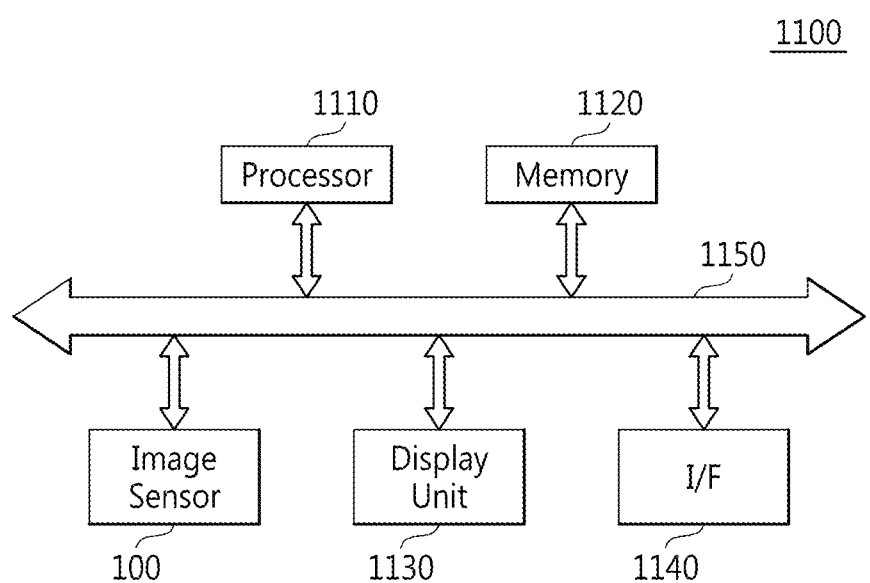
FIG. 11 is a block diagram of an image processing system 1100 including the image sensor 100, according to other exemplary embodiments of the inventive concept.

FIG. 11 is a block diagram of an image processing system 1100 including the image sensor 100 according to other exemplary embodiments of the inventive concept. Referring to FIG. 11, the image processing system 1100 may include a processor 1110, a memory 1120, the image sensor 100, a display unit 1130, and an I/F 1140.

The processor 1110 may control the operation of the image sensor 100. The processor 1110 may generate a two or three dimensional image based on depth information and color information (e.g., at least one among red information, green information, blue information magenta information, cyan information, and yellow information) from the image sensor 100.

The memory 1120 may store a program for controlling the operation of the image sensor 100 through a bus 1150 according to the control of the processor 1110 and may also store the image. The processor 1110 may access the memory 1120 and execute the program. The memory 1120 may be formed as a non-volatile memory.

The image sensor 100 may generate two or three dimensional image information based on a digital pixel signal (e.g., color information or depth information) under the control of the processor 1110.

The display unit 1130 may receive the image from the processor 1110 or the memory 1120 and display the image on a display (e.g., a liquid crystal display (LCD) or an active-matrix organic light emitting diode (AMOLED) display). The I/F 1140 may be formed for the input and output of the two or three dimensional image. The I/F 1140 may be implemented as a wireless I/F.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), compact disc ROMs (CD-ROMs), magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

At least one of the components, elements or units represented by a block as illustrated in FIGS. 1-3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

In an image sensor and an image processing system including the same according to the above exemplary embodiments of the inventive concept, power consumption in a counter and a buffer included in the image sensor may be decreased by decreasing the resolution of the counter when an analog gain is high.

Also, in an image sensor and an image processing system including the same according to the above exemplary embodiments of the inventive concept, power consumption in a counter and a buffer included in the image sensor may be effectively decreased by gradationally decreasing the resolution of a counter according to an analog gain.

Also, in an image sensor and an image processing system including the same according to the above exemplary embodiments of the inventive concept, an error in a digital pixel value caused when the resolution of a counter is decreased may be corrected to maintain the quality of an image.

While the inventive concept has been particularly shown and described with reference to exemplary embodiments thereof, it will be understood that various changes in form and details may be made therein without departing from the spirit and scope of the following claims.

What is claimed is:

1. An image sensor comprising:
   a comparator configured to generate a comparison signal by comparing a ramp signal with a pixel signal;
   a counter configured to generate a digital pixel value by counting an input clock signal according to the comparison signal; and
   a divider configured to control a frequency of the input clock signal according to an analog gain of the image sensor,
   wherein the input clock signal is an internal clock signal of the image sensor or a frequency-reduced internal clock signal generated by reducing a frequency of the internal clock signal based on the analog gain, and
   wherein the divider controls the frequency of the input clock signal to output the internal clock signal in response to the analog gain being less than a threshold value, and output the frequency-reduced internal clock signal in response to the analog gain being greater than or equal to the threshold value.

2. The image sensor of claim 1, further comprising a bit shifter configured to shift the digital pixel value by a number of bits determined according to the analog gain.

3. The image sensor of claim 1, further comprising a timing generator configured to compare the analog gain with at least one reference gain, and generate a frequency control signal for controlling the divider according to a result of the comparing the analog gain with the at least one reference gain.

4. The image sensor of claim 3, wherein the divider comprises:
   a plurality of circuits each configured to control a frequency of an internal clock signal at a ratio of 1/2j, wherein j denotes an integer equal to or greater than 1; and
   a multiplexer configured to select one of the internal clock signal and outputs of the plurality of circuits, and output the selected signal as the input clock signal.

5. The image sensor of claim 3, wherein the divider is configured to control the frequency of the input clock signal at a ratio of 1/2N determined according to the frequency control signal, wherein N denotes an integer equal to or greater than 0.

6. The image sensor of claim 5, further comprising a bit shifter configured to shift the digital pixel value by a number of bits determined according to the frequency control signal or the analog gain.

7. The image sensor of claim 3, further comprising a ramp signal generator configured to generate the ramp signal,
   wherein the ramp signal has a slope of decrease from an original level determined according to the analog gain or the frequency control signal.

8. The image sensor of claim 7, further comprising a buffer configured to receive the digital pixel value from the counter after the ramp signal returns to the original level from the slope of decrease.

9. An image processing system comprising:
   an image sensor; and
   a digital signal processor configured to determine an analog gain of the image sensor,
   wherein the image sensor comprises:
     a comparator configured to generate a comparison signal by comparing a ramp signal with a pixel signal;
     a counter configured to generate a digital pixel value by counting an input clock signal according to the comparison signal; and
     a divider configured to control a frequency of the input clock signal according to the analog gain of the image sensor,
   wherein the digital signal processor is further configured to correct a digital pixel signal of the digital pixel value by a number of bits determined by a frequency control signal or the analog gain,
   wherein the input clock signal is an internal clock signal of the image sensor or a frequency-reduced internal clock signal generated by reducing a frequency of the internal clock signal based on the analog gain, and
   wherein the divider controls the frequency of the input clock signal to output the internal clock signal in response to the analog gain being less than a threshold value, and output the frequency-reduced internal clock signal in response to the analog gain being greater than or equal to the threshold value.

10. An image sensor comprising:
    a timing generator configured to compare an analog gain of the image sensor with at least one reference gain, and generate a frequency control signal as a result of the comparison;
    a comparator configured to generate a comparison signal by comparing a ramp signal with a pixel signal; and
    a counter configured to generate a digital pixel value by counting an input clock signal according to the comparison signal; and
    a divider configured to control a frequency of the input clock signal according to the result of a comparison,
    wherein the input clock signal is an internal clock signal of the image sensor or a frequency-reduced internal clock signal generated by reducing a frequency of the internal clock signal based on the analog gain, and wherein the divider controls the frequency of the input dock signal to output the internal clock signal in response to the analog gain being less than a threshold value, and output the frequency-reduced internal clock signal in response to the analog gain being greater than or equal to the threshold value.

11. The image sensor of claim 10, wherein a level of the input clock signal varies according to the analog gain.

12. The image sensor of claim 11, wherein the divider is configured to control the frequency of the input clock signal at a ratio of 1/2N determined according to the frequency control signal, wherein N denotes an integer equal to or greater than 0.

13. The image sensor of claim 11, wherein the divider comprises:
- a plurality of flip-flops each configured to control a frequency of an internal clock signal at a ratio of 1/2j, wherein j denotes an integer equal to or greater than 1; and
- a multiplexer configured to select one of the internal clock signal and outputs of the plurality of flip-flops, and output the selected signal as the input clock signal.

14. The image sensor of claim 10, further comprising a bit shifter configured to shift the digital pixel value by a number of bits determined according to the result of the comparison.

15. An image sensor comprising:
- a divider configured to receive an internal clock signal and output the internal clock signal or a frequency-reduced internal clock signal which is generated by reducing a frequency of the internal clock signal based on an analog gain of the image sensor;
- a counter configured to count an input clock signal, which is the internal clock signal or the frequency-reduced internal clock signal, and output a digital pixel value corresponding to the counted input clock signal, wherein the divider is configured to output the internal clock signal in response to the analog gain being less than a threshold value, and output the frequency-reduced internal clock signal in response to the analog gain being greater than or equal to the threshold value.

16. The image sensor of claim 15, wherein the counter is configured to count the input clock signal by counting a number of rising or falling edges of the input clock signal.

17. The image sensor of claim 15, wherein the divider is configured to output the frequency-reduced internal clock, of which a frequency is reduced in proportion to the analog gain, as the input clock signal of the counter.

18. The image sensor of claim 15, wherein the analog gain is set based on an illuminance of at least one previous frame sensed by the image sensor.

* * * * *